(12) United States Patent
Boukli-Hacene

(10) Patent No.: US 9,057,884 B2
(45) Date of Patent: Jun. 16, 2015

(54) READING GLASSES ATTACHABLE TO A KEYBOARD

(71) Applicant: Mounir Boukli-Hacene, Atlanta, GA (US)

(72) Inventor: Mounir Boukli-Hacene, Atlanta, GA (US)

( * ) Notice: Subject to any disclaimer, the term of this patent is extended or adjusted under 35 U.S.C. 154(b) by 0 days.

(21) Appl. No.: 13/762,639

(22) Filed: Feb. 8, 2013

(65) Prior Publication Data

US 2013/0208232 A1    Aug. 15, 2013

Related U.S. Application Data

(60) Provisional application No. 61/597,651, filed on Feb. 10, 2012.

(51) Int. Cl.
| | |
|---|---|
| *G02C 1/00* | (2006.01) |
| *G02C 5/02* | (2006.01) |
| *G02C 13/00* | (2006.01) |
| *G02C 5/12* | (2006.01) |
| *G02C 3/04* | (2006.01) |

(52) U.S. Cl.
CPC ............... *G02C 5/02* (2013.01); *G02C 13/001* (2013.01); *G02C 5/128* (2013.01); *G02C 3/04* (2013.01); *G02C 5/12* (2013.01)

(58) Field of Classification Search
CPC ............ G02C 1/00; G02C 1/02; G02C 1/023; G02C 1/206; G02C 1/04; G02C 5/02; G02C 5/04; G02C 5/045; G02C 5/06; G02C 11/00; G02C 2200/02; G02C 1/026; G02C 5/128
USPC ................ 351/67–81, 110, 136, 158, 63, 137
See application file for complete search history.

(56) References Cited

U.S. PATENT DOCUMENTS

| | | | | |
|---|---|---|---|---|
| 843,089 | A | * | 2/1907 | Moore ............................ 351/76 |
| 1,385,828 | A | | 7/1921 | Hogue |
| 2,040,527 | A | * | 5/1936 | Nerney ........................... 351/71 |
| 2,311,991 | A | | 2/1943 | Nerney |
| 2,459,051 | A | | 1/1949 | Smith |
| D298,212 | S | | 10/1988 | Gross |
| 5,015,087 | A | * | 5/1991 | Baratelli ......................... 351/65 |
| D329,446 | S | | 9/1992 | Negishi |
| D386,777 | S | | 11/1997 | Hall et al. |
| D389,854 | S | | 1/1998 | Nason |
| D524,612 | S | | 7/2006 | Wakasugi |
| D667,629 | S | | 9/2012 | Alamo |
| D672,625 | S | | 12/2012 | Serret |
| 2011/0043749 | A1 | * | 2/2011 | Alley ............................ 351/111 |
| 2013/0188122 | A1 | * | 7/2013 | Daole ............................ 351/158 |
| 2013/0258269 | A1 | * | 10/2013 | Shalon ........................... 351/79 |

* cited by examiner

*Primary Examiner* — Huy K Mai

(57) ABSTRACT

Reading glasses may be stored on a key of a keyboard. The reading glasses may also be kept inside a laptop computer when the laptop computer is open or closed without causing consequential damage to the reading glasses or laptop components.

19 Claims, 3 Drawing Sheets

READING GLASSES ATTACHABLE TO A KEYBOARD

CROSS REFERENCE TO RELATED APPLICATIONS

This application claims priority to Provisional U.S. Patent Application No. 61/597,651, filed Feb. 10, 2012, the contents of which is incorporated herein by reference in its entirety.

This application is related to a co-pending design application, filed on the same day as this application. The co-pending design application 29/445,246 is incorporated herein by reference in its entirety.

TECHNICAL FIELD

Embodiments disclosed herein generally relate to eyeglasses.

BACKGROUND

Eyeglasses, which may include reading glasses and sunglasses, are often temporarily misplaced or lost permanently by their wearers when a wearer removes the eyeglasses and leaves the eyeglasses lying in a forgotten location or when the eyeglasses are accidentally dropped.

SUMMARY

Reading glasses may be stored on a key of a keyboard. The reading glasses may also be kept inside a laptop computer when the laptop computer is open or closed without causing consequential damage to the reading glasses or laptop components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

As described herein, in an embodiment a pair of eyeglasses may comprise an integrated bridge and nose pad (hereinafter bridge pad) with lenses that may be able to fit within a closed laptop. The bridge pad may be made to fit around or about a keyboard key. The design of the pair of eyeglasses may allow for storing of the pair of eyeglasses within a laptop and may reduce the need to purchase substitute eyeglasses due to misplacement.

Figure 1:
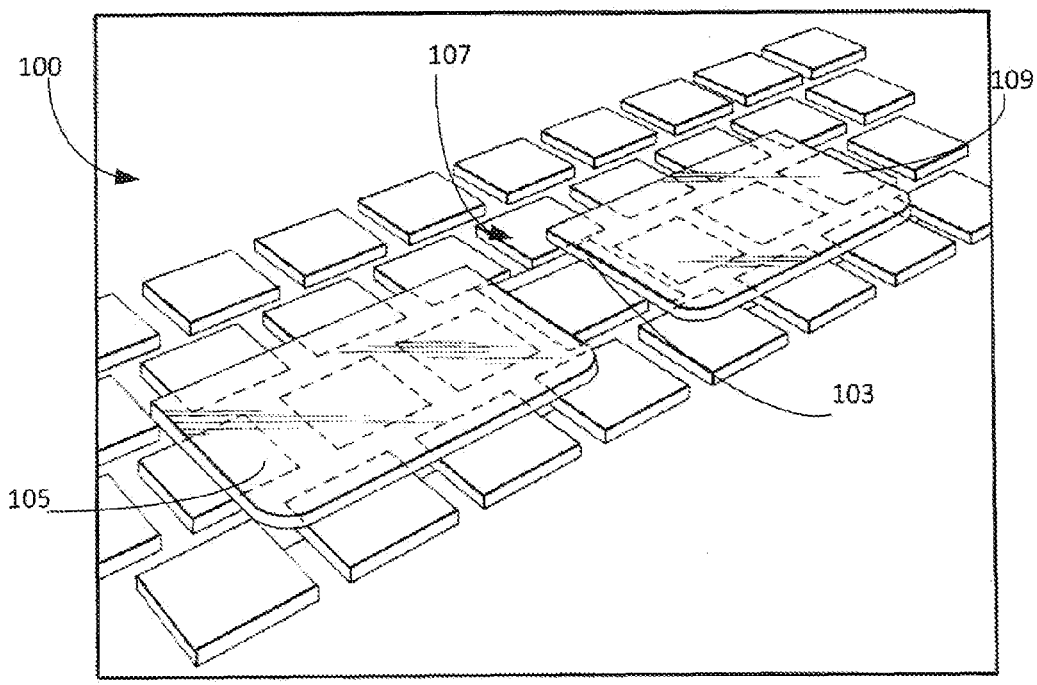
FIG. 1 illustrates a perspective view of an exemplary non-limiting pair of eyeglasses on a laptop keyboard.

FIG. 1 illustrates a perspective view of a non-limiting, exemplary pair of eyeglasses on a laptop keyboard. A bridge pad 107 is connected with lenses 105 and 109. Lenses 105 and 109 lay on top of the laptop keys. Bridge pad 107 is constructed to fit in the spacing around key 103. The dotted lines show elements, such as keys and portions of the bridge pad, located under lenses 105 and 109. In an embodiment, temples (not shown) may be attached to the pair of eyeglasses and may be constructed to fit within the spacing between the keys.

Figure 2:
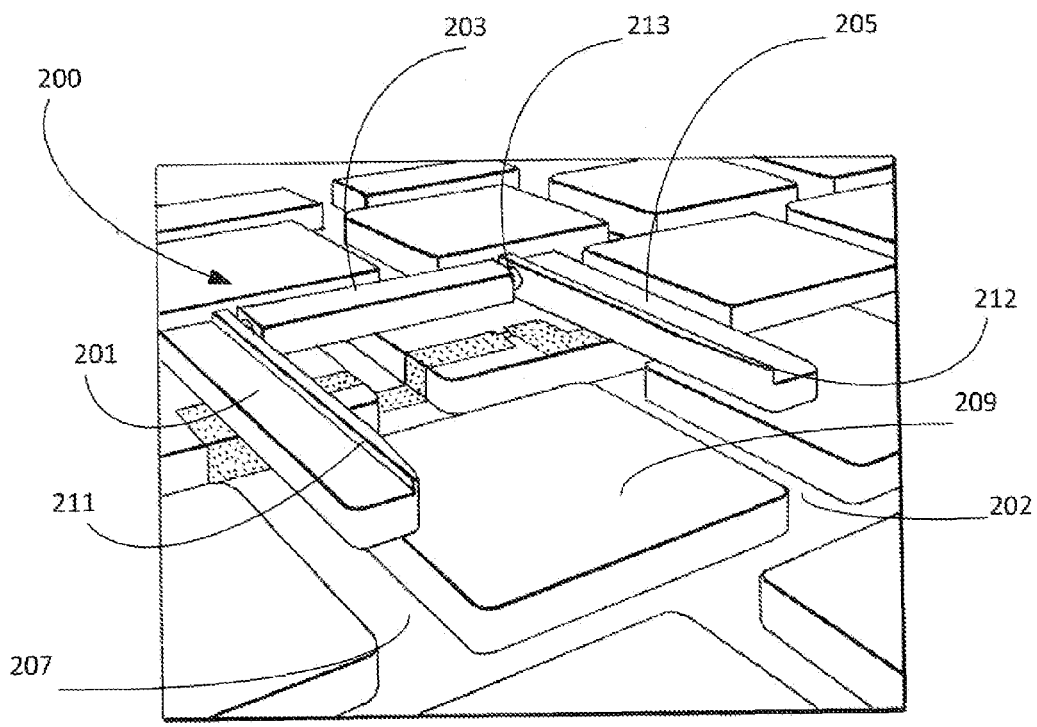
FIG. 2 is an perspective view of a bridge pad with no attached lenses and hovering over keyboard keys.

FIG. 2 is a perspective view of an exemplary bridge pad 200 with no attached lenses and hovering over keyboard keys. Bridge pad 200 has a left segment 201 and a right segment 205. There is space in between the keys of the keyboard, such as a space 207 and a space 202. A middle segment 203 may be connected with left segment 201 and right segment 205. The middle segment 203 may be positioned substantially perpendicular to left segment 201 and right segment 205. Bridge pad 200 may be configured to flex in a manner that fits a nose of a person, and the shape of a keyboard key, among other things. Middle segment 203 may be connected with right segment 205 and left segment 201 in a manner that tapers to create a joint, such as joint 213, that allows the right segment 205 and the left segment 201 to flex outward, but having enough tension to pinch and remain on a nose. Protruding surface 211 may be integrated, glued, or otherwise attached with left segment 201. Surface 211 may assist in keeping attached lenses in place and protecting the nose from an attached lens. Segment 205 may have a protruding surface 212 that is similar in construction to protruding surface 211.

Left segment 201 may have dimensions that substantially fit within space 207. Right segment 205 may have dimensions that substantially fit within space 202. Middle segment 203 may have dimensions that fit a space above key 209 (not shown). Although many keyboards have space between keys as shown, bridge pad 200 may be constructed to substantially fit other keyboard key form factors. Bridge pad 200 may be made of plastic, metal, or any other material that allows for bridge pad 200 to be secured to a person's nose. In an embodiment, bridge pad 200 may be magnetic in order to fit more securely within or on a laptop or other devices such as a mobile phone or a tablet computer.

Figure 3A:
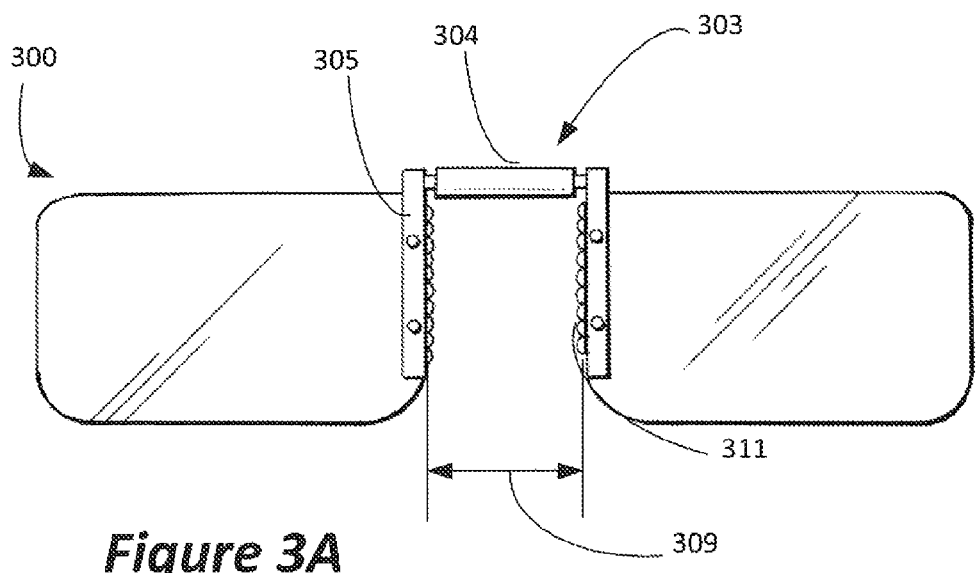
FIG. 3A illustrates a front view of an exemplary pair of eyeglasses designed to fit the shape of a keyboard key.
Figure 3B:
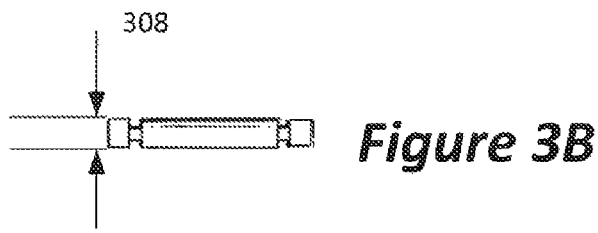
FIG. 3B illustrates a non-limiting, top view of the bridge pad of the pair of eyeglasses of FIG. 3A.

FIG. 3A illustrates a front view of a non-limiting, exemplary pair of eyeglasses 300 designed to fit the shape of a keyboard key. In this embodiment, the bridge 303 of the pair of eyeglasses 300 is situated so that the middle segment 304 is near the top of the lenses. Bridge pad 303 is attached to the lenses by screws, such as screw 305. Bridge pad 303 may be configured with ridges 311 that may help keep the eyeglasses on the nose of a person. Bridge pad 303 may flex in order to fit a person's nose. In an embodiment, a keyboard key may be a width of approximately 15 millimeters (mm). The inside distance 309 of bridge pad 303 may also be approximately 15 mm. The bridge pad 303 may be able to flex to the width of the root of the nose which averages 30 mm or nasal end of the nose which averages 35 mm. FIG. 3B is top view of the bridge pad 303. The width/thickness 308 of the bridge pad may be 35 mm or less in order to be approximately the same height or less than a keyboard key when the bridge pad is laid flat.

Figure 4:
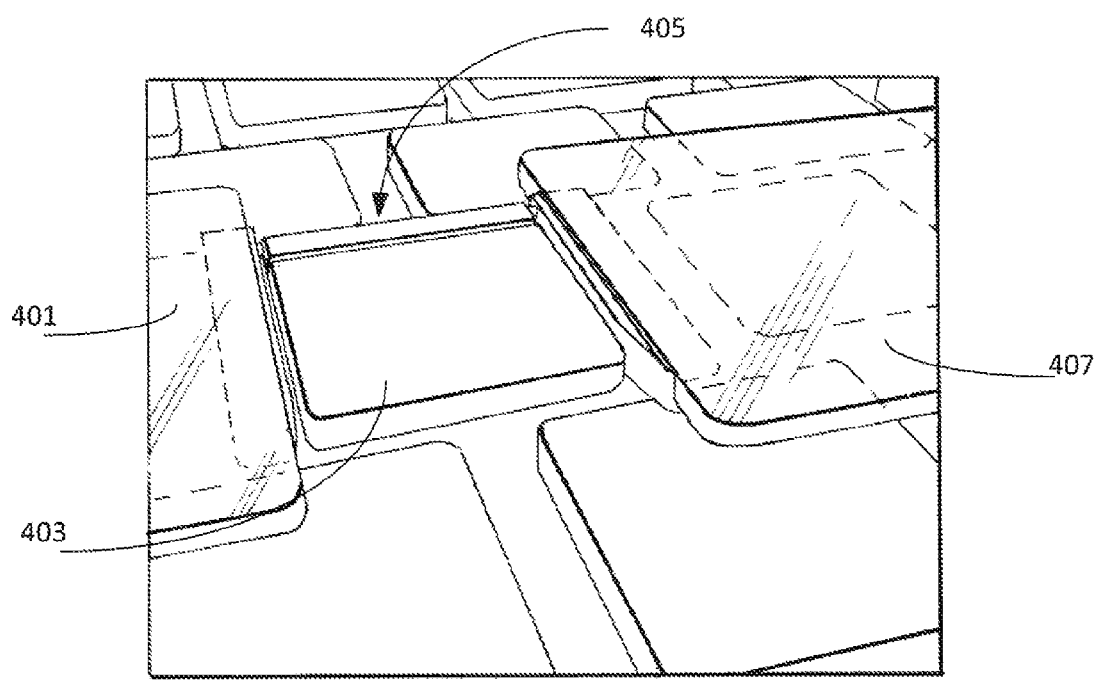
FIG. 4 is a close-up perspective view of an exemplary pair of eyeglasses on a keyboard.

FIG. 4 is a close-up perspective view of an exemplary pair of eyeglasses laid flat on a keyboard, which gives further detail of how a bridge pad 405 may be designed to fit around a key 403. Here, bridge pad 405 is in a shape that fits around a square shaped key 403. In this embodiment, bridge pad 405 is substantially parallel to lenses 401 and 407, connecting flush with a face of each lens. Bridge pad 405 may be connected with lenses 401 and 407 with any fastener such as screws, glue, hook and loops, and the like, or otherwise fused or molded with the lenses, without limitation. In an embodiment, lenses 401 and 407 may be enclosed in a frame (e.g., metal frame or plastic) and the frame (not shown) may be connected with bridge pad 405 by a fastener or otherwise fused or molded with the frame. In an embodiment, bridge pad 405 may be part of the frame, such as a single plastic or metal mold. Although the lenses, as shown, are rectangular, the lenses of any embodiment may be any shape, such as a circular or an oval shape. In an embodiment, as shown in FIG. 4, bridge pad 405 when placed flat within the keyboard may be substantially the same height as key 403.

Figure 5A:
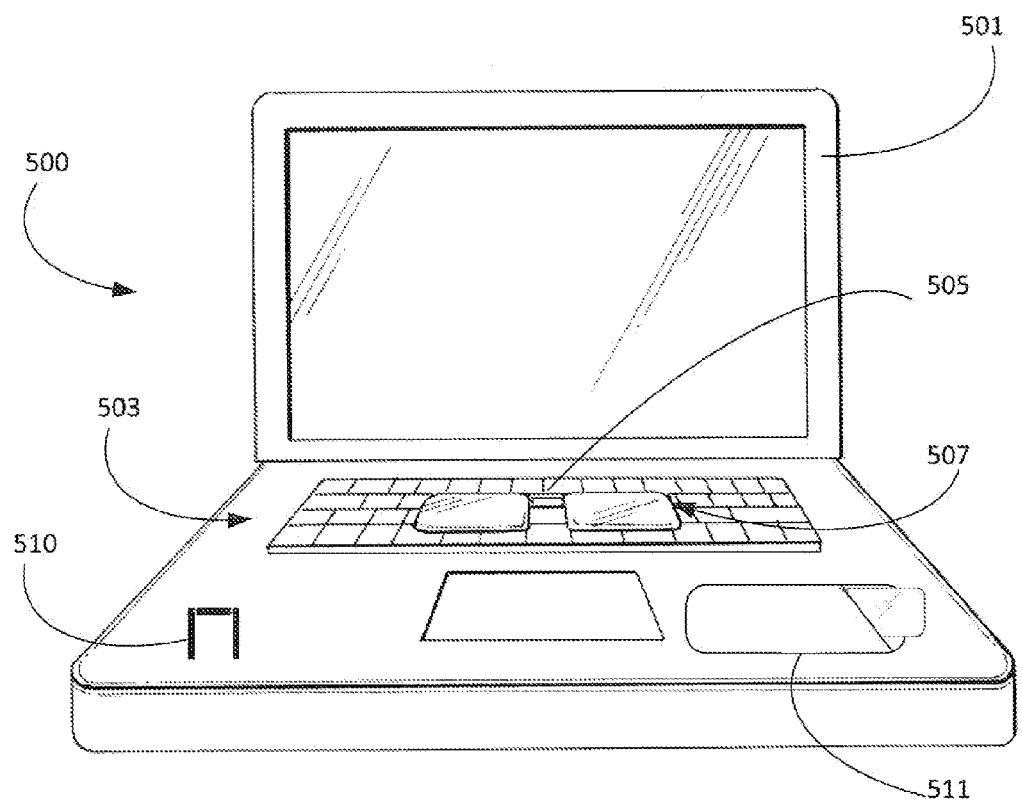
FIG. 5A is a perspective view of an exemplary laptop and a pair of eyeglasses on a laptop keyboard.
Figure 5B:
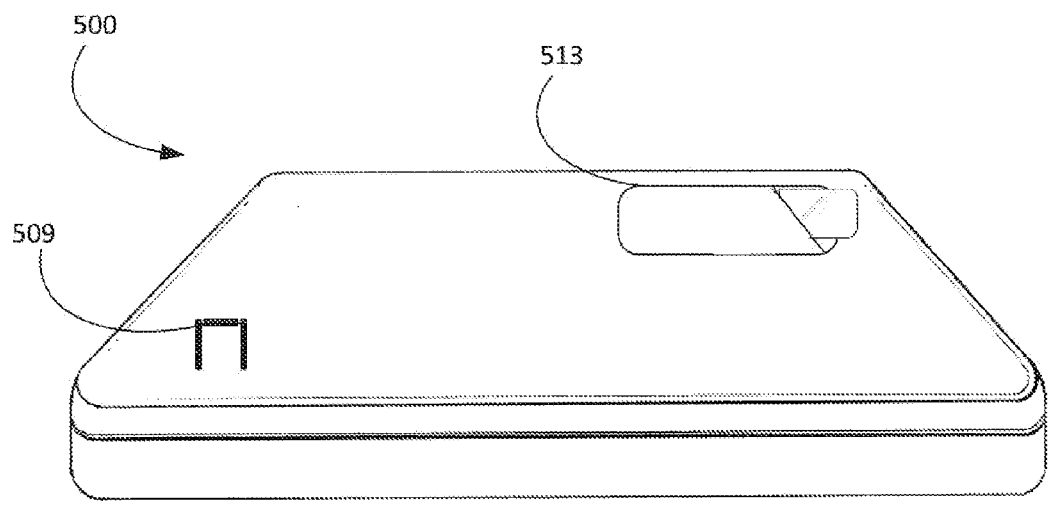
FIG. 5B is a perspective view of the laptop of FIG. 5A closed.

FIG. 5A is a perspective view of an exemplary laptop 500 and a pair of eyeglasses 507 on a laptop keyboard 503. A laptop 500 has an attached monitor 501 and a keyboard 503. In an embodiment, a bridge pad 505 of the pair of eyeglasses 507 may be recessed between the keys of the keyboard 503. Eyeglasses lenses of pair of eyeglasses 507 as well as bridge pad 505 of pair of eyeglasses 507 may be of an appropriate thickness so that the monitor 501 may be able to substantially close over keyboard 503 with pair of eyeglasses 507 remaining on the laptop keyboard 503. Pair of eyeglasses 507 has minimal thickness and a recessed bridge pad design that may allow the closing of laptop 500, as shown in FIG. 5B, without consequential damage to laptop 500 or pair of eyeglasses 507. In an embodiment, pair of eyeglasses 507 may be designed with appropriate thickness so that even if the lens and bridge pad lay on top of the laptop keys, the laptop may still close, as discussed herein. In another embodiment, a pouch 511 or 513 may be attached to laptop 500. Pouch 511 and 513 may be located on any face of the laptop, as shown in FIGS. 5A and 5B. A pair of eyeglasses, designed like pair of eyeglasses 507, may be inserted into pouch 511 or 513. Pouch 511 or 513 may also be attached to other devices such as a tablet computer or mobile phone.

In an embodiment, an external female attachment 509 or 510 may be designed to receive bridge pad 505 in a manner that allows the bridge pad 505 disclosed herein (i.e., male apparatus) to clip or otherwise attach to the external female apparatus. The female apparatus 509 may already be attached (e.g., hooks and loop, magnet, glue, and the like) or integrated to a face of laptop 500 or another device (e.g., a tablet computer, mobile phone, device cover/casing, or other subject matter). In another embodiment, the bridge pad may be of varying shape (e.g., semi-circular) and not necessarily in a shape designed to fit about a keyboard key, but rather in a shape designed to fit the external female attachment that will receive the bridge pad as discussed above or any bridge of a pair of eyeglasses. In an embodiment, the male-female relationship, as discussed herein, may be reversed so that the bridge pad 505 of the pair of eyeglasses may be the female component and external attachment 509 to receive the bridge pad 505 may be the male component. Clips or other similar apparatuses may be used to attach a pair of eyeglasses glasses to a laptop, tablet computer, mobile phone, or other device.

Although keyboard glasses have been described in connection with the exemplary embodiments shown in the various figures, it is to be understood that other similar embodiments may be used or modifications and additions may be made to the described embodiments without deviating from the embodiments. A closed or substantially closed laptop as discussed herein, for example, may refer to the latching of a laptop monitor to the base or other mechanism such as a hinge. Not all laptops have latches, but the concept of a closed laptop as discussed herein is generally appreciated and understood by one of ordinary skill in the art.

Figures are not drawn to scale and may be viewed in conjunction with the detailed description. Although features and elements are described above in particular combinations, one of ordinary skill in the art will appreciate that each feature or element can be used alone or in any combination with the other features and elements. Therefore, the keyboard glasses as described herein should not be limited to any single embodiment, but rather should be construed in breadth and scope in accordance with the appended claims.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. An eyeglass kit comprising:
    a pair of eyeglasses comprising:
        a lens; and
        a bridge pad affixed to said lens, said bridge pad comprising:
            an integrated bridge and nose pad, and
            a middle segment connected at a left end of said middle segment to a left segment and connected at a right end of said middle segment to a right segment, wherein said middle segment is tapered near said left end and said right end such that said left segment and said right segment are configured to flex outward;
    a pouch adapted to carry said pair of eyeglasses; and
    an attachment adapted to attach said pouch to a mobile computing device.

2. The eyeglass kit of claim 1, further comprising a cover for the mobile computing device adapted to cover the mobile computing device.

3. The eyeglass kit of claim 1, wherein said attachment comprises an adhesive.

4. The eyeglass kit of claim 1, wherein the mobile computing device comprises a mobile phone or a cover of the mobile phone.

5. The eyeglass kit of claim 1, wherein said attachment comprises a cooperating hook and loop fastener, a magnetic bridge of said pair of eyeglasses, or glue.

6. An eyeglass kit comprising:
    a pair of eyeglasses comprising:
        a lens; and
        a bridge pad affixed to said lens, said bridge pad comprising:
            an integrated bridge and nose pad, and
            a middle segment that is tapered on a right end and a left end, wherein said tapered left end and right end allow said bridge pad to flex open; and
    an attachment adapted to attach said bridge pad to a mobile computing device.

7. The eyeglass kit of claim 6, wherein said attachment comprises:
    a female apparatus in a shape of said bridge pad of said pair of eyeglasses; or
    a male apparatus in a shape of said bridge pad of said pair of eyeglasses.

8. The eyeglass kit of claim 6, wherein said pair of eyeglasses is without temples.

9. The eyeglass kit of claim 6, wherein the mobile computing device comprises a mobile phone or cover of said mobile phone.

10. The eyeglass kit of claim 6, wherein said mobile computing device is selected from the group consisting of a laptop, a cover of said laptop, a tablet computer, or a cover of said tablet computer.

11. The eyeglass kit of claim 6, wherein said attachment is adapted to affix to said mobile computing device via at least one of a cooperating hook and loop fastener, or a magnet.

12. The eyeglass kit of claim 6, further comprising a pouch adapted to carry said pair of eyeglasses.

13. The eyeglass kit of claim 12, further comprising a second attachment adapted to attach said pouch to the mobile computing device.

14. A pair of eyeglasses comprising:
a lens; and
a bridge pad affixed to said lens, said bridge pad comprising:
an integrated bridge and nose pad, and
a middle segment that is tapered on a right end and a left end, wherein said tapered left end and right end allow said bridge pad to flex open.

15. The pair of eyeglasses of claim 14, wherein said pair of eyeglasses is without temples.

16. The pair of eyeglasses of claim 14, wherein the bridge pad has ridges on a left segment and a right segment of the bridge pad.

17. The pair of eyeglasses of claim 14, wherein the bridge pad is affixed to the lens with at least one of glue, a screw, or hook and loops.

18. The pair of eyeglasses of claim 14, wherein the bridge pad is magnetic.

19. The pair of eyeglasses of claim 14, wherein an inside distance between a left segment of the bridge pad and a right segment of the bridge pad is approximately 15 mm when the bridge pad is in a resting state.

\* \* \* \* \*